United States Patent [19]

Lindström et al.

[11] Patent Number: 4,578,562
[45] Date of Patent: Mar. 25, 1986

[54] METHOD AND CONTROL SYSTEM FOR CONTROLLING AN INDUSTRIAL ROBOT

[75] Inventors: Lars Lindström, Västerås; Kent Nilsson, Laxå, both of Sweden

[73] Assignee: ASEA AB, Västerås, Sweden

[21] Appl. No.: 596,605

[22] Filed: Apr. 4, 1984

[30] Foreign Application Priority Data

Apr. 8, 1983 [SE] Sweden ................................ 8301964

[51] Int. Cl.⁴ ............................................. B23K 9/12
[52] U.S. Cl. .............................. 219/125.1; 219/130.5; 901/3; 901/41; 901/42
[58] Field of Search ........... 219/124.22, 125.1, 125.11, 219/130.5; 901/3, 4, 41, 42

[56] References Cited

U.S. PATENT DOCUMENTS

| | | | |
|---|---|---|---|
| 4,145,593 | 3/1979 | Merrick et al. | 219/125.11 |
| 4,224,501 | 9/1980 | Lindbom et al. | 901/42 |
| 4,390,954 | 6/1983 | Manning | 219/130.5 |
| 4,445,022 | 4/1984 | Mori | 219/125.1 |

FOREIGN PATENT DOCUMENTS 56-14308  2/1981  Japan ...................................... 901/42

Primary Examiner—Clifford C. Shaw
Attorney, Agent, or Firm—Burns, Doane, Swecker & Mathis

[57] ABSTRACT

For controlling a work process carried out by means of a robot (RB), instructions are stored both relating to the positioning of the robot and relating to the very process to be accomplished. The process instructions are stored in the form of process stage instructions (SPS, SPM and SPE) comprising (a) process start stage, during which the process is initiated (the arc is struck, for instance, when arc welding is involved) and the relative movement between object and robot can be started;

(b) process main stage, during which the actual process is carried out; and, at least when the process is not directly followed by a further process;

(c) process terminal stage, during which the process is terminated (the arc is broken, for instance, when arc welding is involved) and the relative movement between object and robot can be stopped.

A control system for a robot includes memory (PM) for robot instructions, including data for specific process parameters, operating means (OP) for storing robot instructions and means (CU, SS, WC) for automatically carrying out the process controlled by the instructions. The operating means have a control lever (34) with motion in at least two dimensions for controlling said specific parameter data, particularly during execution of a process main stage.

12 Claims, 4 Drawing Figures

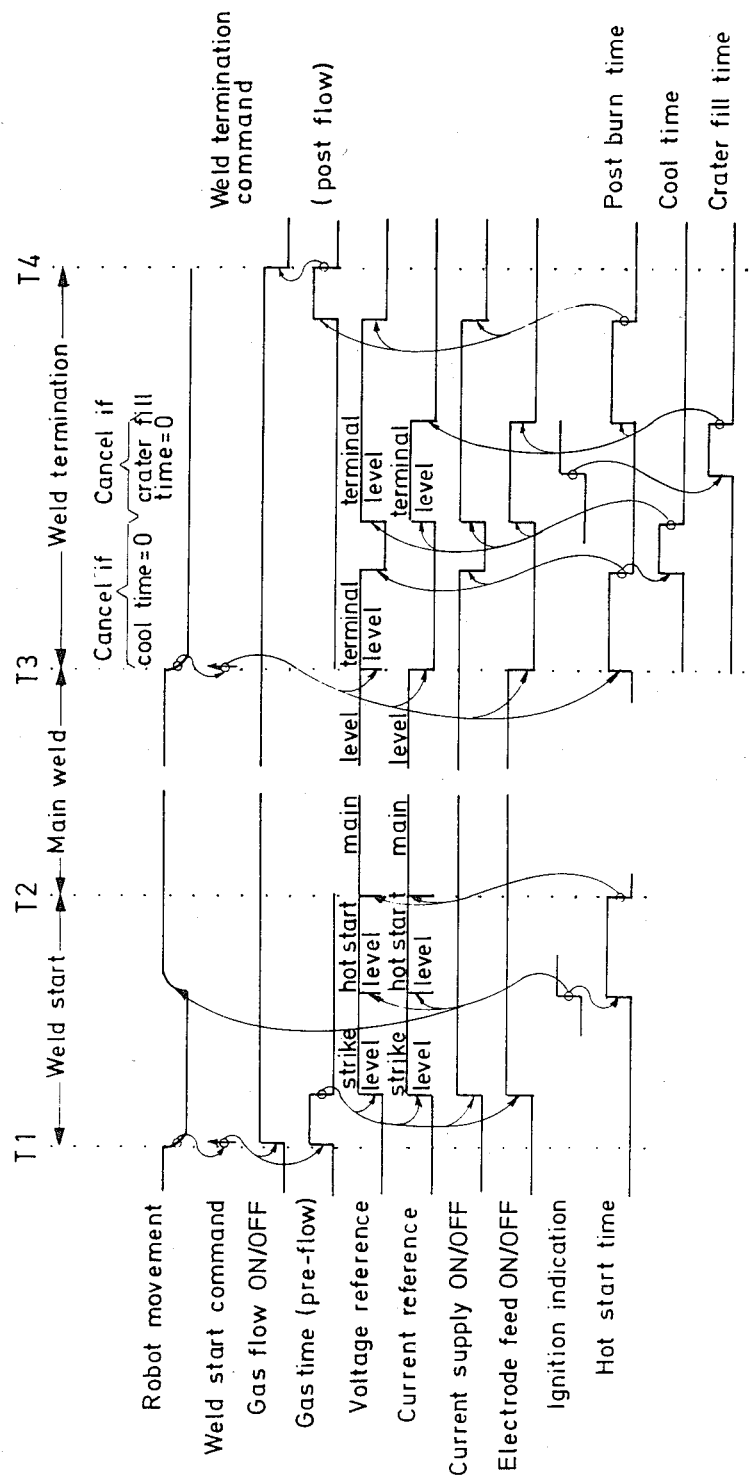

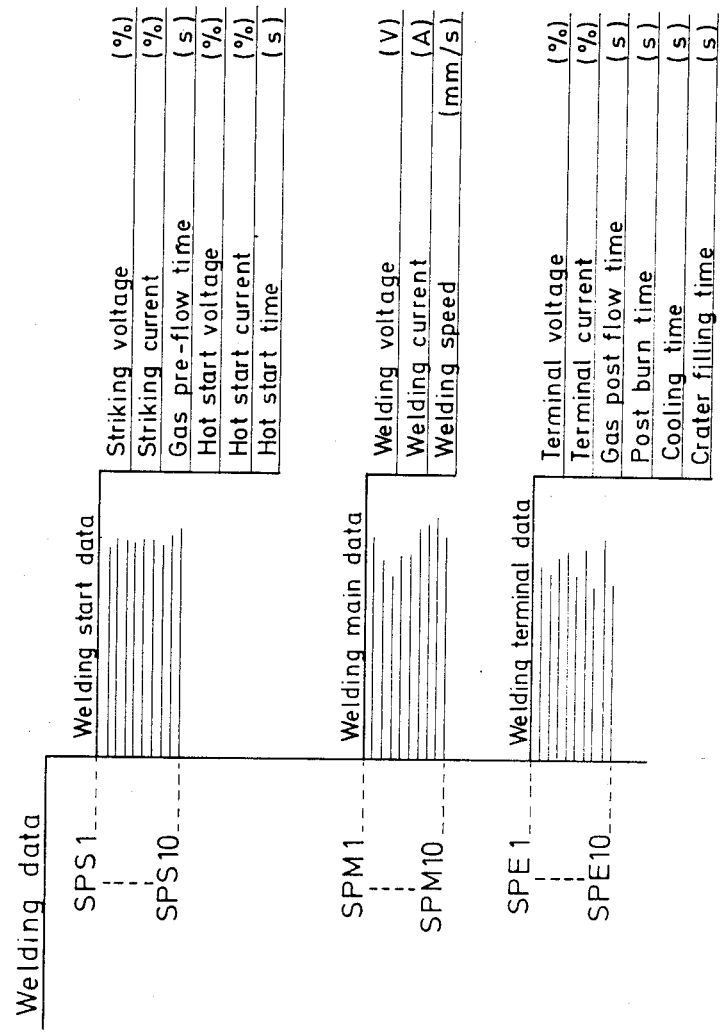

METHOD AND CONTROL SYSTEM FOR CONTROLLING AN INDUSTRIAL ROBOT

TECHNICAL FIELD

The present invention relates to automatic work processes carried out with the aid of an industrial robot, the work processes involving continuous working operations while the industrial robot moves relative to the object on which the process is carried out. The invention relates more specifically to a method of controlling such a process executed by an industrial robot, a control system for an industrial robot arranged for carrying out such a process, and a specific use of a control lever in conjunction with carrying out such a process with the aid of an industrial robot.

Primarily, the invention relates to processes wherein material is applied to the object from the robot in a controlled way, such as in the form of a bead, strand or the like, involving controlling of several essential process parameters. A most typical process of this kind is arc welding, another typical process being glueing.

Arc welding thus being a most typical example of a process for implementing the invention, the invention will be further described mainly with reference to arc welding so as to facilitate the understanding thereof. However, those skilled in the art will realize that other fields of use are possible as well.

TECHNICAL BACKGROUND

It is known to carry out arc welding processes with the aid of a robot, instructions to the robot being stored partly for positioning by the robot of welding equipment in relation to the object on which the arc welding process is carried out, partly for welding operations which are to be carried out, the process being carried out by the robot being caused to execute the stored instructions for it. The welding instructions contain information or data or values relating to different welding parameters such as welding voltage, welding current, welding speed, protective gas etc. When storing the instructions, consideration should be paid to striking and terminating or breaking the arc, the division of the welding process into different operations, which can be unconnected, to changes in the welding direction, e.g. in corners etc. In many cases this makes the storing of instructions difficult and often leads to the welding result obtained not being entirely satisfactory, which requires alterations in instructions. With the present methods for this, it is complicated and time-consuming.

Furthermore, control systems are known for a robot arranged for carrying out an arc welding process, which include memory means for storing robot instructions partly for positioning welding equipment by the robot in relation to the object on which the process is carried out, partly for process operations which are to be carried out, the instructions including data or levels for specific welding parameters such as welding voltage, welding current and welding speed; control means for loading instructions into said memory means; and means adapted for controlling the robot in accordance with instructions stored in said memory means in the automatic performance of an arc welding process. Said control means can include a control lever for controlling positioning of the robot in conjunction with storing instructions while utilizing the so-called "Teaching method". Different button sets can be arranged for loading or writing-in welding instructions.

OBJECT OF THE INVENTION

The object of the present invention is to provide a new method of storing and modifying instructions in conjunction with carrying out a working process with the aid of a robot, whereby disadvantages are removed and a series of advantages are gained, such as:

a start and termination can be handled separately and in principle independent of the actual intermediate process;

direct transitions between different processes of a working procedure are facilitated, particularly in conjunction with changes in direction;

better control of the operational distance;

simpler modification of process parameters, particularly during the actual process;

simultaneous availability of several parameters in conjunction with their modification;

"direct contact" with the process by the utilization of an analogue multifunction operating means for parameter modification.

SUMMARY OF INVENTION

The above mentioned object is achieved in accordance with the invention by a method of control and a control system and a control "lever" use having the distinguishing features disclosed in the appended claims.

Thus, in accordance with a first aspect of the invention, a method of the general kind previously accounted for in conjunction with arc welding essentially means that, for a process, instructions are stored in the form of process stage instructions (or sub-process instructions), respectively comprising (a) process start stage, during which the process is initiated (the arc is struck, for instance, when arc welding is involved) and the relative movement between object and robot can be started;

(b) process main stage, during which the actual process is carried out; and, at least when the process is not directly followed by a further process;

(c) process terminal stage, during which the process is terminated (the arc is broken, for instance, when arc welding is involved) and the relative movement between object and robot can be stopped.

Each process stage instruction can thus contain particular process parameter data or levels for the instruction in question.

It is emphasized that in the present context the term "instructions" is intended to have wide meaning and thus also include pure sets or collections of data values etc, i.e. the term is not to be given a limited meaning based on computer programming.

It is further emphasized that although the robot instructions are here said to include both positioning instructions and process stage instructions, these different instructions do not need to be separate, but may be included in one and the same robot instruction.

The different process stage instructions can to advantage have the character of or include, "sub-programs" which are callable separately. In this case several sub-programs can be stored to advantage for the respective process stage. In this way different process start stages, process main stages and process terminal stages can be combined in a very simple way for a given process in accordance with the particular conditions applicable to the process in question.

It is emphasized that the term "sub-program" in the present context is intended to have a wide meaning, e.g. also including pure sets or collections of process parameter data.

The execution of a work process thus involves in general that the robot is first positioned to a point in the working area of the robot in accordance with stored instructions for positioning the robot, subsequent to which the actual process is carried out or executed in response to stored process instructions, preferably while calling for sub-programs corresponding to a process start stage, a process main stage and a process terminal stage.

The invention signifies that in continuous transition from one process to a subsequent process one can go from execution of the process instructions of the process main stage of the first-mentioned process to execution of the process instructions of the process main stage of the subsequent process. This means in turn that the resulting effect, such as a welding bead, is given an entirely continuous and extremely uniform course even during the transition itself. No intermediate terminal stage is needed.

In accordance with a preferred embodiment of the method in accordance with the invention there are stored for the respective process stage (a) permanent instructions relating to the general implementation of the process stage in the form of parameters which are to be actuated and in which order the actuation shall take place, (b) instructions or sub-programs relating to specific data or levels of at least certain process parameters selectable or changeable by the operator. The loading of robot instructions will thus be simple, uniform and clear.

The implementation of the different process stages is thus fixed, in that what parameters (i.e. in practice what control system inputs and outputs) that are involved have been decided beforehand. On the other hand, the operator who loads instructions can freely select specific process data, i.e. specify levels for or values of analogue signals, times and the like, e.g. current, voltage, pre-heating time, etc, when arc welding is involved.

It is particularly advantageous if, for the process start stage and the process terminal stage there are permanently stored certain specific process parameter data or levels (i.e. for voltage and current with regard to arc welding), in the form of factor information (preferably percentages) related to the corresponding specific process parameter data or levels, which are stored for a process main stage. In this way, the operator only needs to store said process parameter data or levels for the process main stage (or the process main stages when there are several such to choose between). It will be understood that in this way it will be simple to store several different sets of process start and terminal stage parameter data, wherein the factor information is different and suited to different kinds of processes, for example.

In accordance with the invention, in the instruction-controlled execution of a process, e.g. in test welding, said specific parameter data or levels can to advantage be modified, e.g. in conjunction with observation of the arc. In this way the latter can be given optimum conditions. As will be understood without difficulty, building up the process instructions in accordance with the invention means that this can be done in a simple way, in that only the process main stage instruction needs to be altered, and then particularly only the previously mentioned specific data or levels which the operator can influence. When the process start and terminal stages are factor related to the process main stage, there is obtained automatic alteration in the first-mentioned of said specific date or levels.

In accordance with the invention said modification is preferably carried out with the utilization of an analogue multifunction control or operation means, preferably a control lever, or so-called "joystick", having motion in at least two and preferably three dimensions, each dimension being assigned a particular one of said at least certain specific process parameters and wherein the stored instruction value is altered for the assigned parameter in response to actuation of the joystick. This method of modifying or adjusting essential process data, such as voltage, current and welding speed with regard to arc welding, means that the operator can simultaneously study the process, such as the arc through a welding screen, and carry out adjustment with the aid of a joystick. By the joystick being an analogue operation means, the operator also has good "direct contact" with the process. This is of great importance for achieving good results.

After the operator has modified affected process parameter data or values with the joystick to a desired extent, the modified data can to advantage be loaded into storage instead of previously existing data in the process main stage instruction or data set which is appropriate. Depending on what conditions there are, it may be also suitable to alter in a corresponding degree the mentioned process parameter data in other processes within a work sequence and/or in remaining process main stage instructions, if there are more of such, e.g. in the form of selectable sub-programs or sets of data. Even here the build-up or structuring of the process instructions in accordance with the invention facilitate such a consequence modification.

In accordance with the invention, in modification according to the above, one can utilize to advantage as a joystick a functionally switchable joystick which, when storing robot instructions in accordance with the teaching method is utilized for positioning the robot.

It should be emphasized that utilization of a joystick for process parameter data modification in accordance with the invention can constitute a normal editing aid in conjunction with developing robot instructions for a process such as arc welding.

In accordance with a second aspect of the invention, a control system of the general kind previously accounted for in conjunction with arc welding essentially means that operating means included in the control system comprise an analogue multifunction operating means, preferably a joystick with motion in at least two, and preferably three dimensions, this joystick being adapted to control specific data or levels of process parameters corresponding to respective dimensions. The joystick is to advantage adapted such that, during automatic execution of a process, the joystick can modify the data or levels of the said specific process parameters of the utilized process instruction in accordance with actuation of the joystick.

In accordance with the invention means are to advantage arranged for storing in the memory means of the control system said modified process parameter data or levels instead of the previously existing corresponding parameter data or levels of the process instructions.

According to a preferred embodiment of the control system in accordance with the invention, the joystick constitutes a joystick included in the operating means of the control system for controlling the positioning of the robot, there being means arranged for switching between both control functions of the joystick.

In accordance with a third aspect of the invention, there is envisaged the use of an analogue multifunction operating means included in the operating means for an industrial robot, preferably a joystick with motion in two and preferably three dimensions, for during a process in progress, automatically controlled by stored instructions, modifying or controlling data or levels for specific process parameters which are assigned to the motion dimensions of the joystick, wherein process parameter data or levels modified by means of the joystick are preferably stored instead of previously existing process parameter data or levels. The process preferably involves arc welding or the application of glue, sealing compound or soft substances for binding objects together.

With regard to the application of glue or the like in accordance with the invention, it should be clear that essential parameters to be controlled involve the application distance, glue flow rate out of the glueing pistol moved by the robot (or the pressure used for causing glue flow) and/or glueing speed, that is, the speed of the glueing pistol relative to the object whereon glue is applied. It will be realized that the control of these essential parameters in many respects corresponds to the control of the essential welding parameters mentioned previously.

It will be clear that a work process may include a sequence of processes which may or may not connect directly to each other.

The invention will now be clarified further by a more detailed description of exemplifying, non-limiting embodiments and with reference to the accompanying drawings.

BRIEF DESCRIPTION OF DRAWING

FIG. 3 is a diagram illustrating the structure and function of a welding process instruction in accordance with the invention.

FIG. 4 is a schedule schematically illustrating the content in the control system memory means of multiple process stage instructions in accordance with the invention in the form of sub-programs.

DESCRIPTION OF EMBODIMENTS

Figure 1:
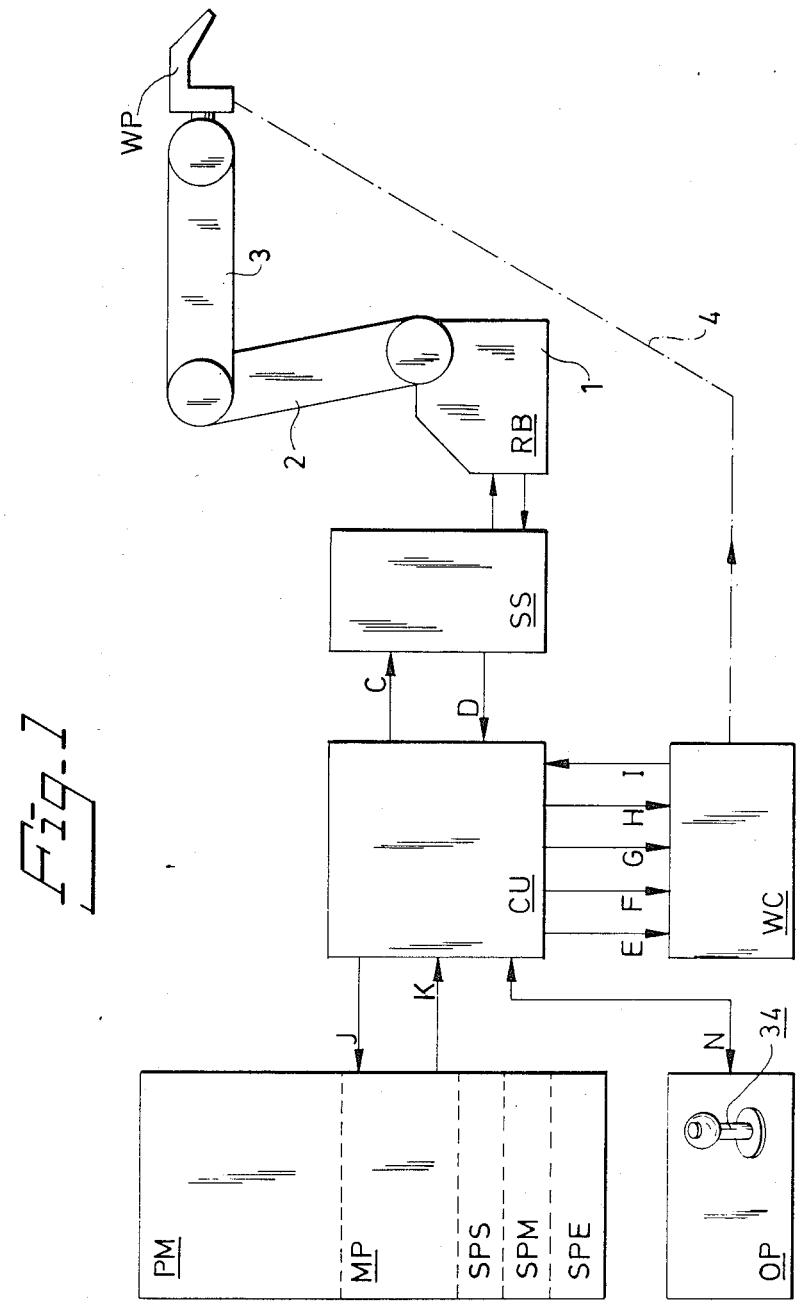
FIG. 1 schematically illustrates an industrial robot intended for arc welding and its associated control system in the form of a block diagram.

In arc welding robot RB with associated control system is illustrated in FIG. 1. The robot has a fixed or rotatable base plate 1 about which a lower arm 2 is rotatable round a horizontal axis. An upper arm 3 is rotatable round a horizontal axis passing through the upper part of the arm 2. A so-called gripper is attached to the upper part of the arm 3, the gripper being controlable in two or more motion dimensions relative the arm 3. The gripper carries a welding pistol WP for arc welding. A current source and feed unit WC is connected to the welding pistol via lines 4 and controls the actual welding process. The unit WC has a plurality of analogue and digital inputs E,F,G,H. Signals are fed to these from the robot control system, the signals defining welding parameters. The unit WC executes the welding process, i.e. switching on and off of protective gas, welding current etc, in accordance with the parameters defined by the signal E-H. The unit sends indication signals I to the robot control system.

The control system includes a central processing unit CU in which there may be included such as a micro processor for controlling the work of the control system. The control unit sends control signals C to the robot servo system SS, which includes, inter alia, driving means for the drive motors controlling the different axial movements of the robot. Feed-back signals D, giving the position of the robot at every instant, area obtained via the servo system SS from transducers mounted on the robot. An operating unit OP (illustrated in FIG. 2) contains operating means for controlling the position or speed of the robot during programming work, and operating means for loading desired instructions into the robot program. A three-dimensional joystick is used for controlling the movement and position of the robot. A set of push buttons is arranged for loading remaining instructions. The signals between operating unit OP and central processing unit CU are denoted by N in the figure. A program memory PM is also included in the control system, there being a possibility of storing in said memory a main program MP as well as a plurality of process stage sub-programs SPS, SPM and SPE. The information stored in the memory and the signals controlling the output therefrom are sent from the central processing unit CU to the memory in the form of signals denoted by J in the figures. The signal K denotes the information read out from the memory.

The process stage sub-programs SPS, SPM and SPE respectively contain different start of weld instructions, main weld instructions and termination of weld instructions for a welding process.

Instructions relating to a given set of welding parameters are thus stored in each of the sub-programs, the number of which can be optional. In calling up a given sub-program, the signals E-H assume values defining the welding parameters stored in the sub-program. Loading of the sub-programs is done beforehand. Each sub-program is provided with a number or the like, for identifying the sub-program, e.g. SPS1–SPS10, SPM1–SPM10 and SPE1–SPE10, in the utilization of 10 different sub-programs of each kind.

Each sub-program contains "permanent" instructions relating to what signals E-H are to be affected and in what order this is to take place, and also easily changeable instructions or sets related to certain specific welding parameter data, i.e. the magnitude of certain analogue signals and times, which are defined by the signals E-H.

In FIG. 4 there is schematically illustrated an example of the content of changeable instructions or welding data for the respective sub-programs. Each of the sub-programs SPS contain start of weld data relating to striking voltage level in the form of a percentage, data relating to striking current level in the form of a percentage, data relating to gas pre-flow time in seconds, data relating to hot start voltage level in the form of a percentage, data relating to hot start current level in the form of percentage, and data relating to hot start time in seconds. Each of the sub-programs SPM contains main welding data relating to welding voltage level in volts, data relating to welding current level in amps, data relating to welding speed in mm per second. Each of the sub-programs SPE finally contains termination of weld data relating to termination voltage level in the form of a percentage, data relating to termination current level in the form of a percentage, data relating to gas post flow time in seconds, data relating to post arc burning time in seconds, data relating to cooling time in seconds, and data relating to crater filling time in seconds. All the percentages in the SPS and SPE programs are intended to be in relation to the SPM program to which connection is made in program execution. A percentage statement thus signifies that instant data is the stated percentage of the corresponding data value (for voltage or current) given in the SPM program.

The function of the control system in automatic execution of an arc welding process takes place substantially in the usual manner. Different robot instructions are obtained in sequence when running through the main program. Positioning instructions cause the central processing unit CU to position the robot in the desired position. Welding instructions in the form of process stage sub-programs numbers cause the central processing unit to call up the appropriate sub-programs, which are subsequently executed, i.e. welding parameters are set and supervised in the unit WC in accordance with the instructions in the sub-programs called. In the welding instruction it has been found suitable to have a WELD START instruction with information as to what SPS and SPM sub-programs are to be executed, and also a WELD TERMINATION instruction with information as to what SPE sub-program is to be executed. The WELD TERMINATION instruction can thus only follow after one or more successive WELD START instructions.

The run through of a welding process instruction in accordance with the invention is illustrated in FIG. 3 in the form of a diagram. At the time T1 the robot is positioned in a desired position and a welding process start stage is initiated, controlled by a called-up SPS sub-program. The welding process start stage has been carried out at the time T2 and a welding process main stage takes over directly, controlled by a called-up SPM sub-program. The welding process main stage has been carried out at the time T3 and a welding process termination stage takes over directly, controlled by a called-up SPE sub-program. This has been carried out by the time T4, the welding process thus being completed.

In the diagram, which shall speak for itself and not require further description, a high level on the respective line relates to activated condition for the associated parameter. Actuation or switching between different parameters is indicated by arrows.

It will be understood that the continuous monitoring and control of welding parameters enabled by the present invention signifies that there is complete control over the whole of the welding process, and thus very high quality welds are ensured.

As is apparent from FIG. 3, the division into different process stages means that the essential welding parameters (i.e. voltage, current and travel or welding speed) will be available in a favourable manner for modification during the welding process main stage. Such modification can be controlled from the operating unit OP, and via the central processing unit CU this unit affects corresponding welding parameter signals to the unit WC. In accordance with the invention such control from the operating unit is carried out to advantage with the aid of a joystick having multidimensional motion, as will be described in more detail below. After an adopted modification the central processing unit CU can be commanded to load or store such modified welding parameter data in the SPM sub-program being executed. In conjunction with the execution of like or similar welding processes it can be advantageous also to alter in a corresponding manner instruction data stored in remaining SPM sub-programs or certain selected such sub-programs.

If a further welding process is to be carried out in direct connection to that illustrated in FIG. 3 (for instance in another direction or with other welding parameters), at time T3 the process terminal stage can be cancelled. Instead, a new process main stage is carried out directly or possibly after an intermediate new process start stage in accordance with selected sub-programs SPM and SPS, respectively. Thereafter a suitable SPE sub-program is called for carrying out a process terminal stage. Of course, the robot movement has to be controlled accordingly.

Figure 2:
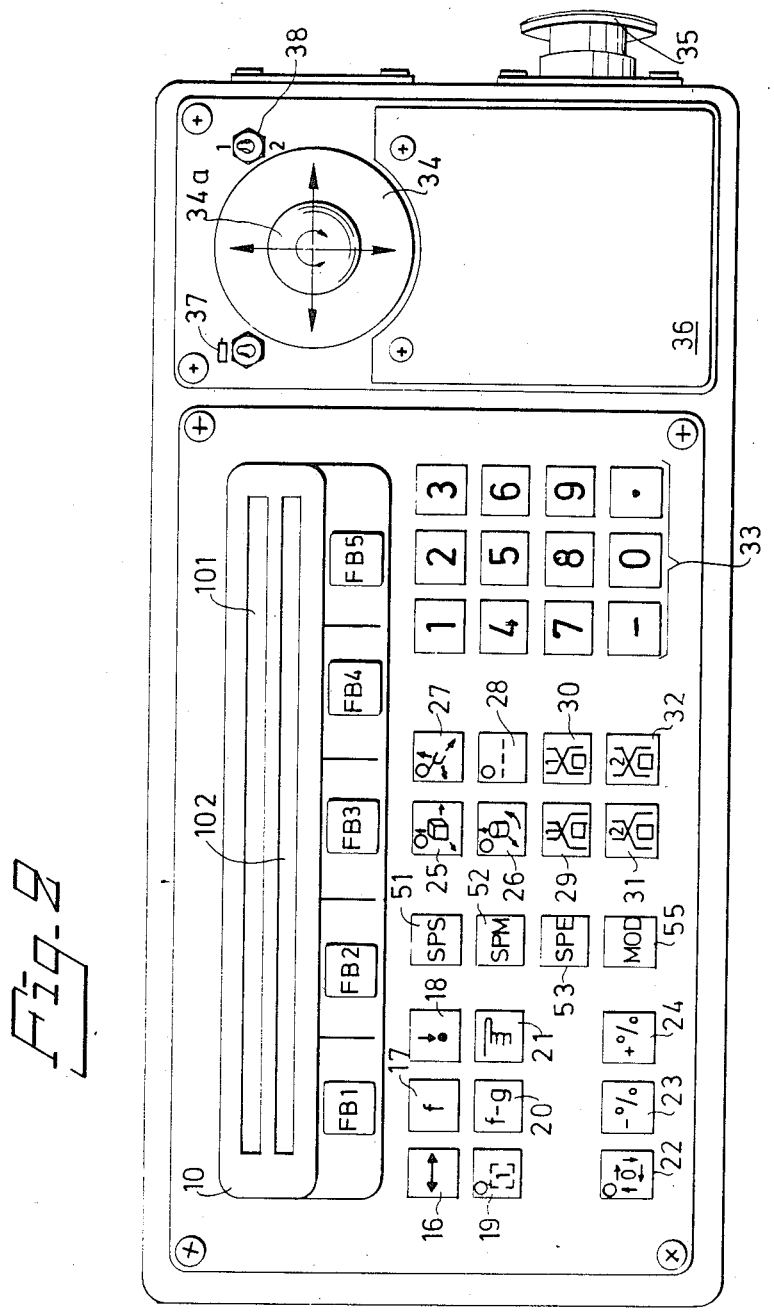
FIG. 2 is a schematic plan view of an operating panel included in the control system according to FIG. 1, and provided with a joystick for welding parameter data modification in accordance with the invention.

In FIG. 2 there is illustrated an example of an operating panel OP with a joystick 34 which can be utilized in accordance with the present invention. In essentials the operating panel is in agreement with the operating panel described in our Swedish patent application 82-03974-4. With respect to the operation of display unit 10 with double information lines 101, 102, shift button 16, function buttons FB1–FB5 with variable functions, function buttons 17–32 with fixed functions, keyset 33, emergency stop 35, safety plate 36 and switches 37, 38, reference is thus had to this Swedish patent application.

For adaption to the utilization in conjunction with the present invention the operating panel is supplemented in two respects. In the first place it has been provided with three buttons 51,52,53 intended for use in loading or storing parameter data for SPS, SPM and SPE sub-programs. In the second place, there is a "modifying" or "override" switch 55 arranged which, on actuation is adapted to switch the joystick 34 with its turnable nob 34a so that instead of controlling the positioning of the robot as usual, it controls the three levels sent to unit WC for the welding parameters voltage, current and speed in conjunction with executing a welding program, in particularly in conjunction with executing a SPM sub-program.

The following apply for joystick motion from the neutral position:
upwards—increase voltage
downwards—decrease voltage
to the right—increase current
to the left—decrease current
Turning the nob 34a of the joystick results in:
clockwise—increase speed
counterclockwise—decrease speed.

The magnitude of the respective movement decides the rate of change. After adopted modification the new levels or values for said welding parameters can be loaded into the associated program as replacement instruction data, in the case of a SPM sub-program by actuation of button SPM and a load button.

With respect to storing of different SPS, SPM and SPE sub-programs in the program memory PM, this is done to advantage in accordance with the general instructions given in the above-mentioned Swedish application, and this is thus referred to again.

The utilization of an operating panel with a display unit means that data for welding parameters which are subject to modification can easily be displayed for and monitored by an operator, who thus has a very good general view over the welding process and the relevant data for it.

As has been indicated previously the invention may be used in conjunction with the application of glue, for instance, Those skilled in the art will readily realize that the apparatus of FIGS. 1 and 2 described above easily can be modified so as to be useful for the application of glue, for instance. Primarily, the welding pistol WP has to be replaced by a glueing pistol. Also, the unit WC and its various inputs E, F, G, H have to be suitably modified so as to be able to control the essential glueing parameters. Otherwise, the operation will be essentially the same as for arc welding.

With regard to the override function of the joystick, in this case the following may apply for joystick motion from its neutral position:

upwards—increase glue flow rate
downwards—decrease glue flow rate
to the right—increase glueing speed
to the left—decrease glueing speed.

Turning the nob 34a of the joystick results in:
clockwise—increase both flow rate and speed.
counterclockwise—decrease both flow rate and speed.

It will be understood that by using this invention in conjunction with the application of a material such as glue, the material may be applied in a very well-defined manner, such as in a strip having a specific amount of material per unit of length, it being possible to correct the process parameters during the application process, for instance due to glue quality changes.

It is emphasized that the invention is naturally not limited to the illustrated and described embodiments. Alterations and modifications are thus possible within the scope of the invention, as will be apparent from the wide interpretation of the following claims.

We claim:

1. A method of controlling a work process carried out on an object with the aid of an industrial robot during relative movement between the object and the robot, robot instructions being stored both with regard to positioning by means of the robot of process equipment relative to the object, and with regard to the process to be carried out, the work process being carried out by the robot executing the stored instructions, comprising the steps of:

storing process instructions in the form of process stage instructions including
(a) a process start stage, during which the process is initiated and relative movement between the object and the robot can be started,
(b) a process main stage, during which the work process is carried out, and
(c) a process terminal stage, during which the process is terminated and relative movement between object and robot can be stopped;

storing for the respective process stages permanent instructions relating to the implementation of the process stage in the form of parameters which are to be brought into action and in which order the activation is to take place, and also storing for the respective process stages instructions or sets relating to specific data of at least some of said process parameters; and modifying at least one instruction or set relating to specific data or levels of at least some of the process parameters, said modifying step utilizing an analog multifunction operating means having motion in at least two dimensions, wherein each dimension is assigned a particular one of said process parameters, the value of the stored instruction being modified for the associated process parameter in response to operation of said operating means.

2. The method of claim 1, wherein the work process is arc welding, and wherein the specific process parameters include at least two of welding voltage, welding current, and welding speed.

3. The method of claim 1, wherein the work process comprises the application of a material on an object, and wherein the specific process parameters include outflow of material and speed of application.

4. The method of claim 1, characterized by storing for the process start stage and the process terminal stage of a process certain specific process parameter data in the form of factor information related to the corresponding specific process parameter data which are stored for the process main stage of the process.

5. The method of claim 1, wherein the work process involves direct transition from one process to a successive process, characterized by going from executing the process instructions of the process main stage of the first mentioned process to execution of the process instructions of the process main stage of the successive process.

6. The method of claim 5, wherein the instructions of an intermediate process start stage are executed between the execution of the process instructions of the process main stage of the first mentioned process and the execution of the process instructions of the process main stage of the successive process.

7. The method of claim 1, wherein said modifying step uses a functionally switchable joystick, which is used for positioning the robot when loading instructions into the robot.

8. The method of claim 7, characterized by storing for the process start stage and the process terminal stage of a process certain specific process parameter data in the form of factor information related to the corresponding specific process parameter data which are stored for the process main stage of the process.

9. The method of claim 7, wherein the work process involves direct transition from one process to a successive process, characterized by going from executing the process instructions of the process main stage of the first mentioned process to execution of the process instructions of the process main stage of the successive process.

10. The method of claim 9, wherein the instructions of an intermediate process start stage are executed between the execution of the process instructions of the process main stage of the first mentioned process and the execution of the process instructions of the process main stage of the successive process.

11. A control system for an industrial robot adapted for carrying out work processes, comprising memory means for storing robot instructions partly for positioning by the robot of process equipment in relation to the object upon which a process is to be carried out, and partly for processes which are to be performed, the process instructions including data for specific process parameters; operating means for loading instructions in said memory means; and means for controlling the robot in automatic execution of a process in accordance with instructions stored in said memory means, wherein:

said operating means include an analog multifunction operating means having motion in at least two dimensions, said analog multifunction operating means arranged to control data of specific process parameters corresponding to the respective dimensions; the data of the specific process parameters of the process instructions being modified in accordance with the actuation of the analog multifunction operating means during automatic execution of the process; said modified process parameters being loaded in said memory means in place of corresponding previous process parameter data of the process instructions; and wherein the analog multifunction operating means also controls the positioning of the robot and means are provided for switching between the different control functions of said analog multifunction operating means.

12. The control system of claim 11, wherein said analog multifunction operating means includes a joystick.

* * * * *